No. 783,426. PATENTED FEB. 28, 1905.
H. B. FREY.
PORTABLE SAWMILL.
APPLICATION FILED JUNE 7, 1904.

5 SHEETS—SHEET 4.

Witnesses.
E. W. Jeppesen.
A. H. Opsahl

Inventor.
Henry B. Frey.
By his Attorneys.
Williamson & Merchant

No. 783,426. PATENTED FEB. 28, 1905.
H. B. FREY.
PORTABLE SAWMILL.
APPLICATION FILED JUNE 7, 1904.
5 SHEETS—SHEET 5.
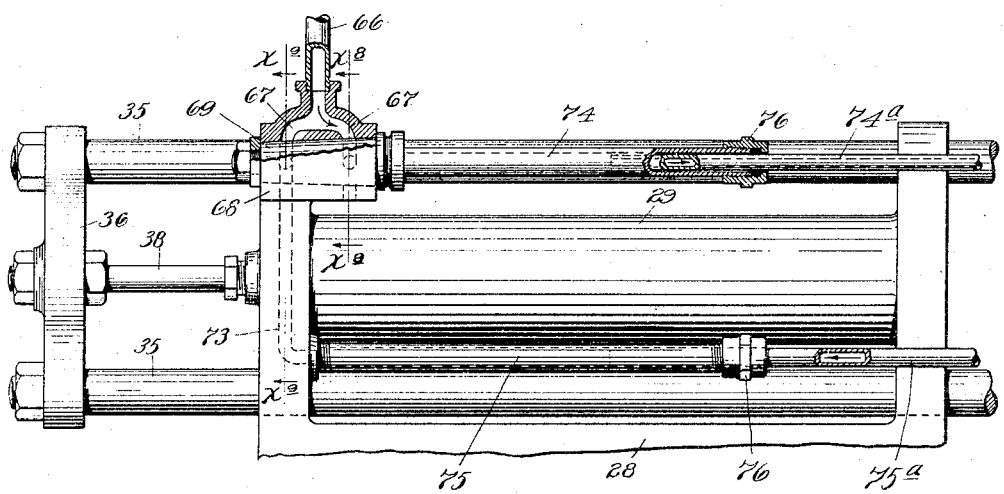
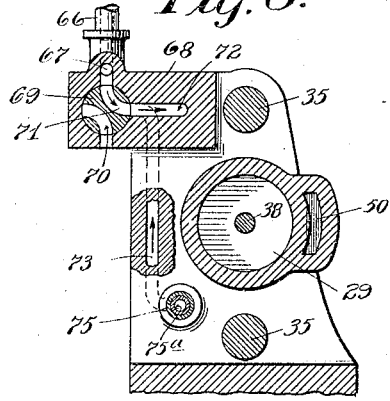
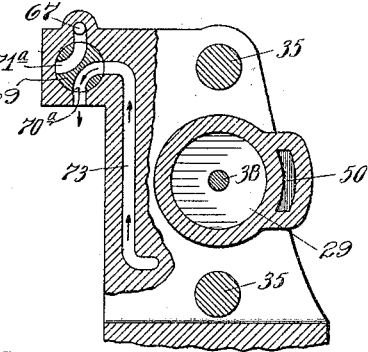
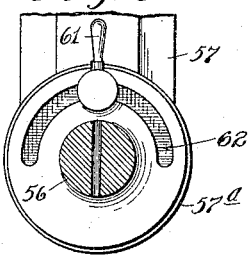
Witnesses.
E. W. Jeppesen.
A. H. Opsahl.
Inventor.
Henry B. Frey.
By his Attorneys.
Williamson & Merchant No. 783,426.  
Patented February 28, 1905.

UNITED STATES PATENT OFFICE.

HENRY B. FREY, OF MINNEAPOLIS, MINNESOTA.

PORTABLE SAWMILL.

SPECIFICATION forming part of Letters Patent No. 783,426, dated February 28, 1905.

Application filed June 7, 1904. Serial No. 211,453.

*To all whom it may concern:*

Be it known that I, HENRY B. FREY, a citizen of the United States, residing at Minneapolis, in the county of Hennepin and State of Minnesota, have invented certain new and useful Improvements in Portable Sawmills; and I do hereby declare the following to be a full, clear, and exact description of the invention, such as will enable others skilled in the art to which it appertains to make and use the same.

My present invention relates to portable sawmills, and has for its object to improve the same in the several particulars hereinafter noted.

The invention consists of the novel devices and combinations of devices hereinafter described, and defined in the claims.

The invention is illustrated in the accompanying drawings, wherein like characters indicate like parts throughout the several views.

In the preferred form of the portable sawmill all parts of the plant are mounted upon and carried by a portable support, and the saw is driven by compressed air or steam operating through a straight-line reciprocating engine. This portable sawmill is especially designed for use in lumbering-camps, and since this use is usually limited to the winter time the component parts of the plant are shown as mounted upon a large and strong flat-bottomed sled, which is capable of freely sliding over snow or ice.

This invention is particularly directed to improved means for adjusting the saw or for setting the same for action in any desired position and for movement in any desired plane regardless of the position of the said supporting-sled—that is, regardless of whether the said sled sets on the ground in a horizontal plane or is tilted materially out of the horizontal plane.

Figure 1:
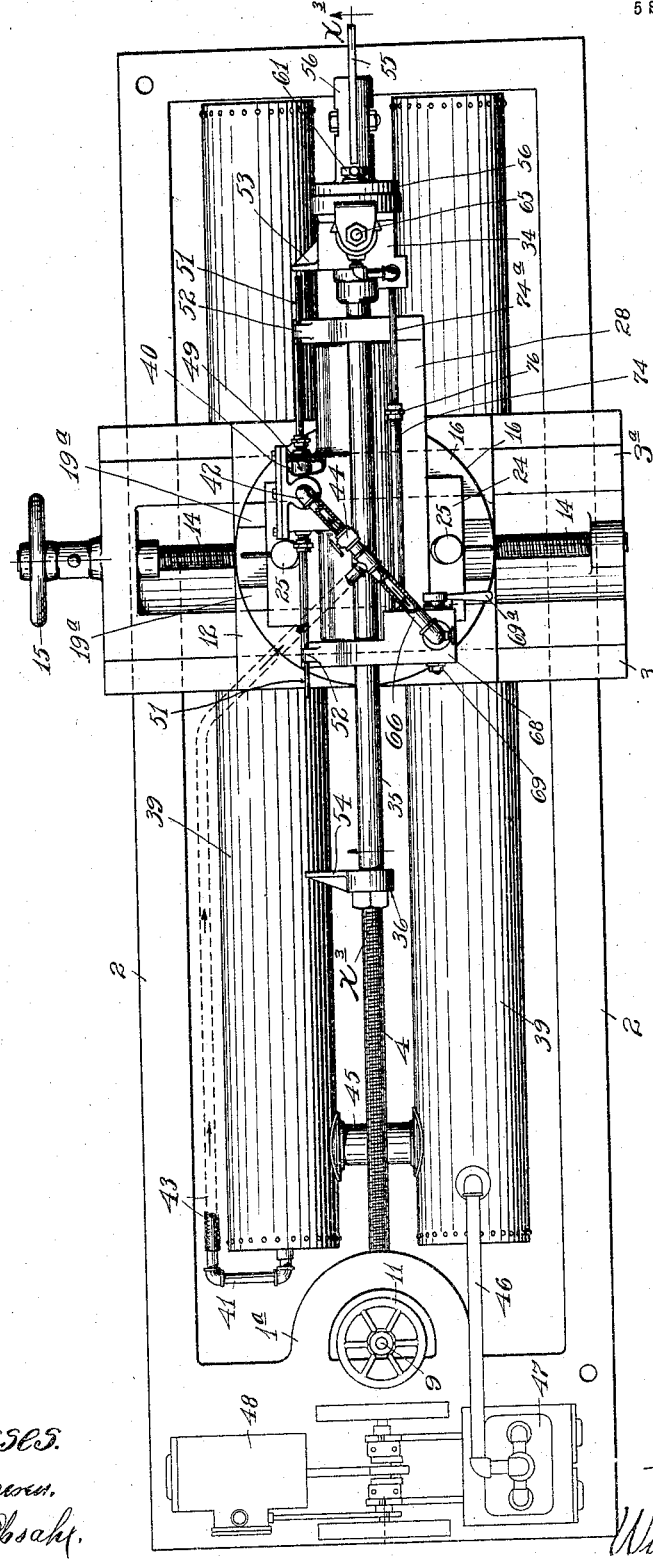
Figure 2:
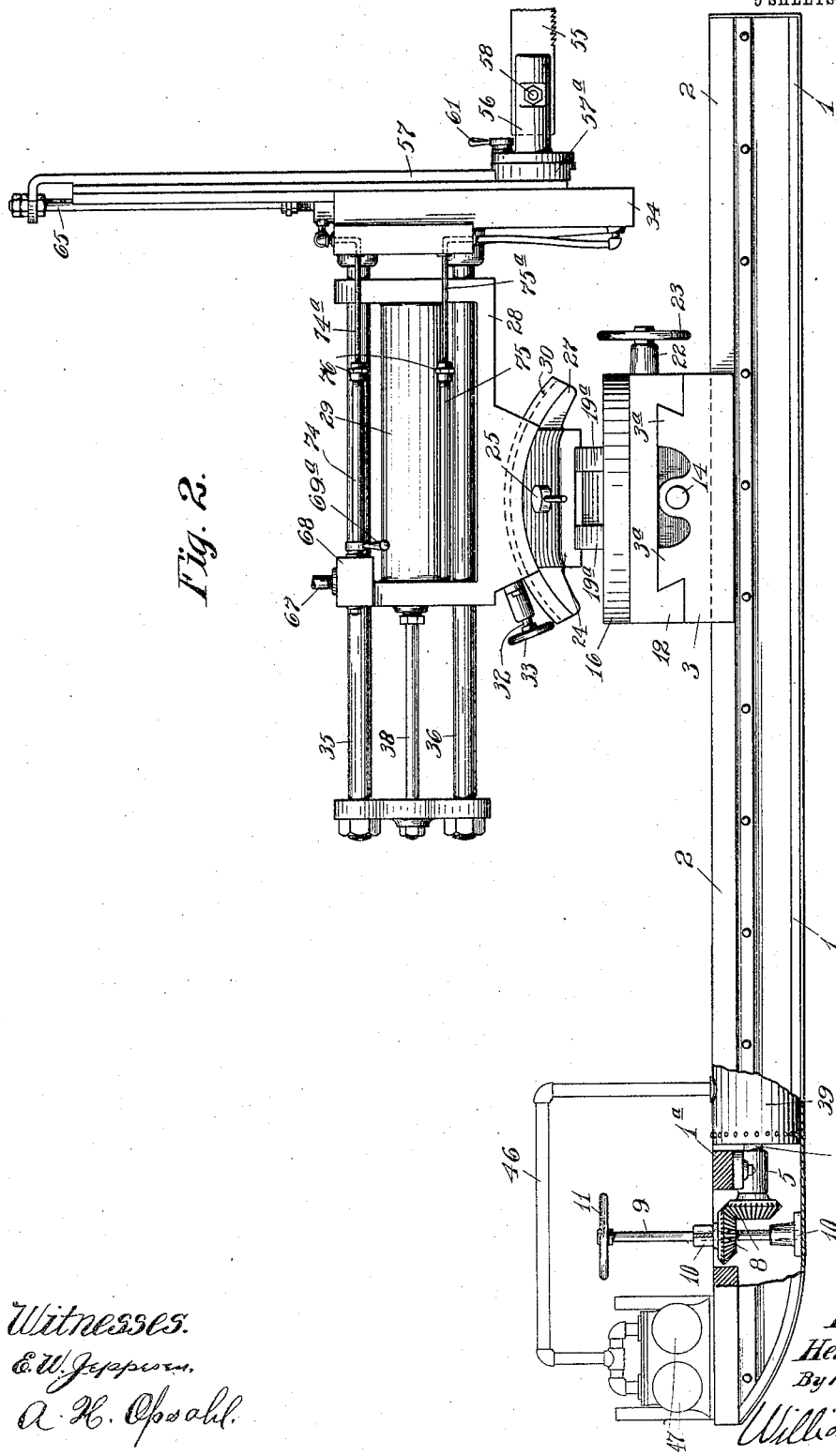
Figure 3:
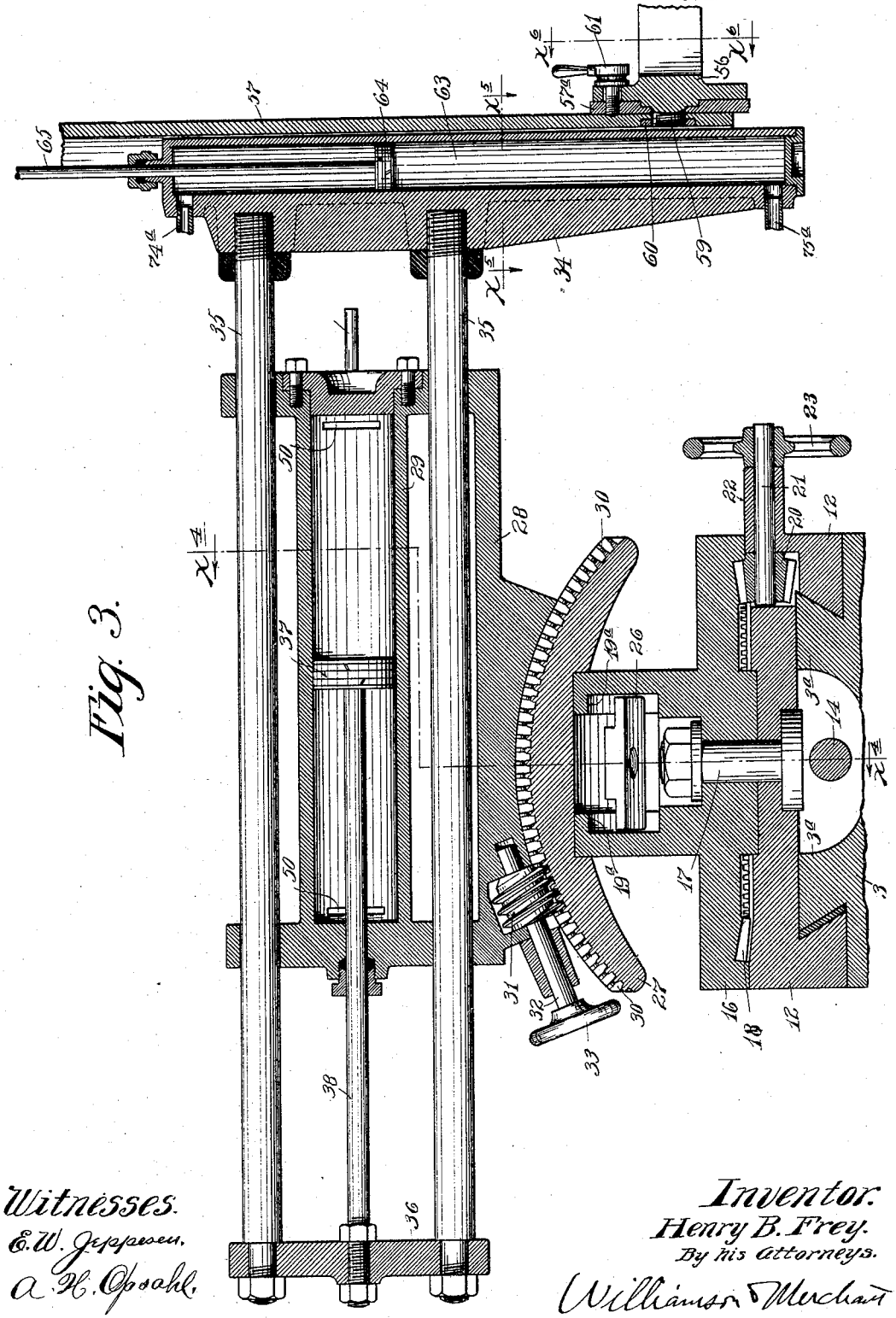
Figure 4:
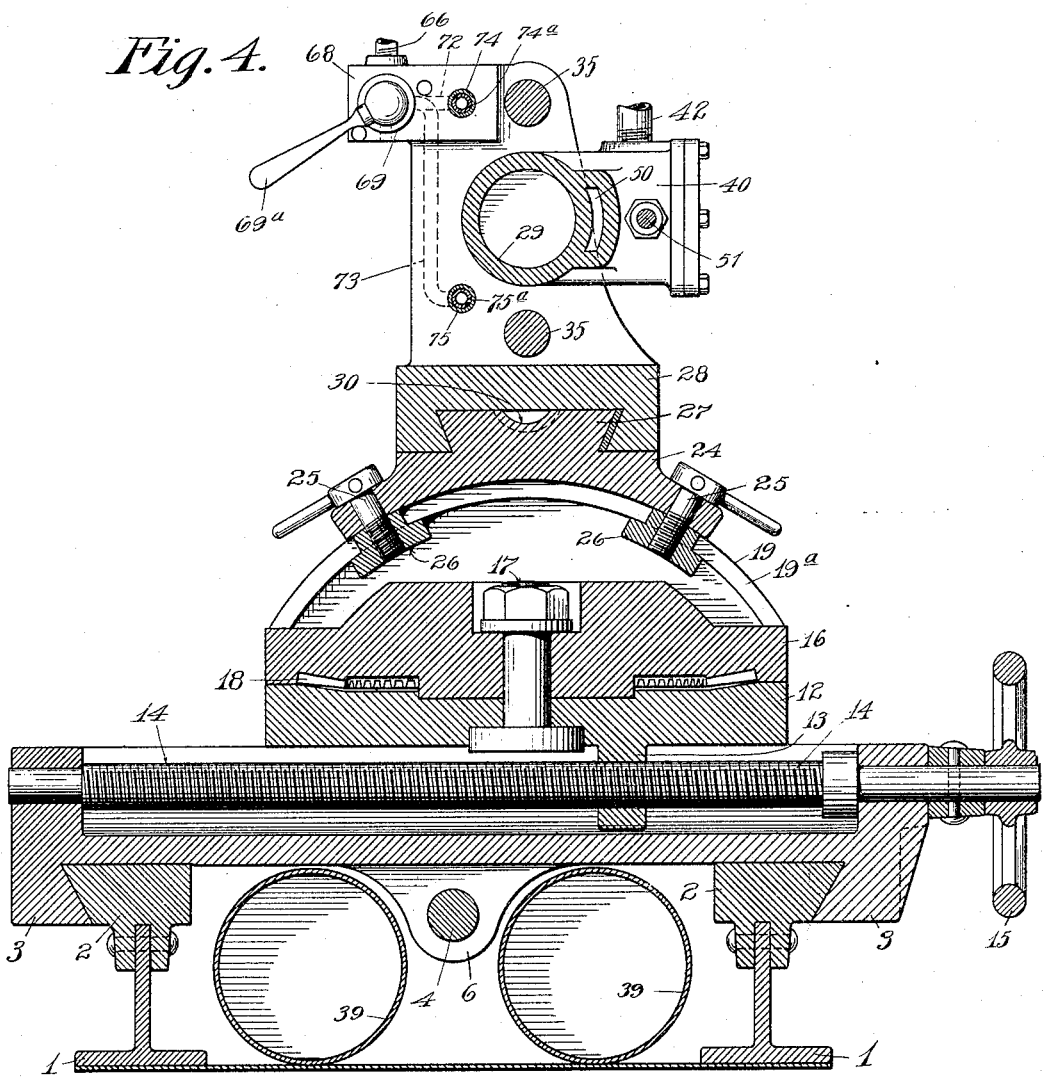
Figure 5:
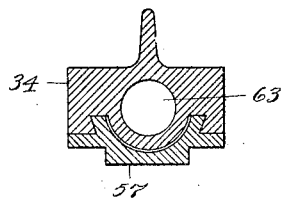

Referring to the drawings, Figure 1 is a plan view of the portable sawmill, some parts being broken away. Fig. 2 is a side elevation of the sawmill with some parts broken away. Fig. 3 is a vertical section taken approximately on the line $x^3 x^3$ of Fig. 1, some parts being removed. Fig. 4 is a transverse vertical section taken approximately on the irregular line $x^4 x^4$ of Fig. 3. Fig. 5 is a detail in section on the line $x^5 x^5$ of Fig. 3, some parts being removed. Fig. 6 is a detail in section on the line $x^6 x^6$ of Fig. 3. Fig. 7 is a detail in side elevation of certain of the parts shown in Fig. 2, said parts being viewed in the same direction as in Fig. 2 and some parts being broken away. Fig. 8 is a transverse vertical section taken on the line $x^8 x^8$ of Fig. 7, and Fig. 9 is a similar view taken on the line $x^9 x^9$ of Fig. 7.

The numeral 1 indicates a heavy flat-bottom sled, to the sides and ends of which is rigidly secured a pair of laterally-spaced longitudinally-extended rails 2, the two rails forming a dovetailed guide over which slides from front to rear of the machine a heavy base-support 3. The base-support 3 is adapted to be moved from the front toward the rear of the sled 1, and vice versa, by means of a long screw-rod 4, which, as shown, is swiveled in a bearing 5 on a transverse portion $1^a$ of the sled and has screw-threaded engagement with a nut-lug 6, that depends centrally from the bottom of the base-support 3.

In the construction illustrated the base-support 3 is arranged to be adjusted by hand-power and is shown as connected, by means of a pair of miter-gears 8, to a vertical shaft 9, mounted in suitable bearings 10 on the forward portion of the sled 1 and provided at its upper end with a hand-wheel 11, by means of which it may be readily turned.

The base-support 3 is provided with a dovetailed guide $3^a$, that extends transversely of the sled 1, preferably at a right angle to the dovetailed guide afforded by the beveled rails 2. Mounted to slide on the dovetailed guide $3^a$ is a secondary base-support 12, which is provided with a depending nut-lug 13 and is adapted to be adjusted under straight-line movements transversely of the machine by means of an adjusting-screw 14, that works through said nut-lug 13, is swiveled in end bearings on the primary base-support 3, and is provided with a hand-wheel 15, by means of which it may be turned.

Pivoted to the secondary base-support 12, with freedom for pivotal movements in a horizontal plane, is a turn-table base 16, (see particularly Figs. 3 and 4,) the said members 12 and 16 being tied together by means of a nutted axially-disposed pivot-bolt 17. The turn-table base 16 on its lower face, inward of its periphery, is formed with a beveled gear 18, and at its upper portion, extending in a vertical plane, it is formed with a segmental bearing arch or guide 19, which, as shown, is bifurcated and formed with inwardly-projecting segmental bearing-flanges 19$^a$. A beveled pinion 20, carried by a short shaft 21, mounted in a bearing 22 on the secondary base-support 12, meshes with the beveled gear 18 of the said turn-table base 16. The shaft 21 at its outer end is provided with a hand-wheel 23, by means of which the pinion 20 may be rotated to impart pivotal movements to the turn-table base 16.

Mounted to oscillate in a vertical plane upon the segmental bearing-surface 19 of the turn-table base 16 is a segmental bearing-block 24. This bearing-block 24 is adapted to be locked wherever set on the bearing-surface 19 by means of clamping-screws 25 and coöperating nut-bars 26, the former of which work loosely through flanges of said block 24 and the latter of which clamp against the segmental flanges 19$^a$. (See Figs. 3 and 4.) The bearing-block 24 is formed with a dovetailed segmental bearing 27, which extends in a vertical plane at a right angle to the plane of the segmental bearing 19. Mounted to oscillate with a sliding movement over the segmental bearing 27 and having dovetailed engagement therewith is a cylinder-casting 28, (see particularly Figs. 3 and 4,) having a long cylinder 29, that extends horizontally in the same vertical plane as the central portion of the segmental bearing 27. The said central portion of the segmental bearing 27 is formed with teeth, affording a segmental worm-gear 30, with which engages a worm 31, carried by a shaft 32, provided with a hand-wheel 33, by means of which it may be turned. The shaft 32 and worm 31 are carried with the cylinder-casting 28—that is, are mounted thereon with freedom for rotary movements, but are held against endwise movements with respect thereto, so that when the worm 31 is rotated the cylinder-casting 28 will be oscillated in a vertical plane.

The saw-carrier, which is preferably constructed as illustrated in the accompanying drawings, involves a primary driving-head 34, which is rigidly connected to the outer ends of a pair of approximately horizontal plungers 35, which in turn are mounted to reciprocate through the end flanges of the cylinder-casting 28 and are rigidly connected at their rear ends by a tie-bar 36. Working within the cylinder 29 is a piston 37, the stem 38 of which is attached at its outer end to the intermediate portion of the tie-bar 36, so that reciprocating movements of said piston will reciprocate the head 34 in a proper direction to impart cutting movements to the saw, as will presently appear.

Air is supplied to the straight-line reciprocating engine, made up of the cylinder 29 and piston 37, from air-storage tanks 39, shown as mounted on the bottom of the sled 1 and connected to the valve-chest 40 of the said engine, as shown, by pipe-sections 41 and 42 and by an intermediate flexible tube 43. (See particularly Fig. 1.) The flexible hose-section 43 permits free adjustments of the cylinder-casting 28 and parts supported thereby. In the pipe-section 42 is a valve 44, which serves as a throttle to throw the reciprocating engine 29 37 into action and out of action at will.

As shown, there are two storage-tanks 39, the same being connected by a neck 45 and being supplied with air through a pipe 46, which leads from a compressor 47, which compressor is shown as driven by an explosive-engine 48. The said engine and compressor are diagrammatically shown in Figs. 1 and 2 and are illustrated as mounted upon the forward end of the sled 1.

The compressed air delivered into the valve-chest 40 is under the action of a slide-valve 49, mounted within said chest, alternately admitted into and exhausted from the opposite ends of the cylinder 29 through ports 50. (See Figs. 1 and 3.) Said valve 49 may be of the usual construction, but is provided with a valve-stem 51, that projects through suitable stuffing-boxes both in the front and in the rear of the chest 40 and, as shown, are further guided by bearings 52 on the projecting bracket-like ends of the cylinder-casting 28. The head 34 has a laterally-projecting tappet 53, which is adapted to engage the right-hand end of the valve-stem 51, and likewise the tie-bar 36 is provided with a laterally-projecting tappet 54, which is adapted to engage with the left-hand end of the valve-stem 51, directions being taken with respect to Fig. 1.

By the action of the tappets 53 and 54 on the valve-stem 51 the valve 49 is shifted at the limits of the stroke of the piston so that the movement of the piston is automatically reversed and the head 34 will be continuously reciprocated as long as the compressed air or steam, as the case may be, is admitted into the valve-chest 40.

The saw 55 is detachably secured to a rotatively-adjustable shank or holder 56, carried by a so-called "secondary driving-head" 57, which in turn has dovetailed engagement with the primary head 34 and is mounted to move vertically thereon. The so-called "saw-shank" 56 is, as shown, bifurcated to embrace one end of the saw 55, and the said saw is secured thereto by a short nutted bolt 58. Furthermore, as shown, the shank 56 has a trunnion 59, which is seated in the lower portion of the vertically-adjustable secondary bearing-head 57 and is engaged by a countersunk nut 60. (See Fig. 3.) The saw-shank 56 is adapted to be locked against rotary movements by means of a clamping-screw 61, which works through a segmental slot 62, cut in the expanded base-flange of said shank 56 and screwed into the hub-like portion 57ª, rigidly secured to and acting as a part of the secondary driving-head 57. The saw 55, illustrated in the drawings, is a simple crosscut-saw supported from one end only; but it will of course be understood that a saw of any suitable form may be employed and that the said saw may be supported in any suitable way.

The primary driving-head 34 is formed with a vertically-disposed cylinder 63, that extends from the upper and lower end thereof. Working in the cylinder 63 is a piston 64, the stem 65 of which is connected at its upper end to the upper extremity of the secondary driving-head 57. (See Figs. 2 and 3.)

The heretofore-noted air-delivery pipe-section 42 has an extension or branch 66, which leads to a port 67 of a valve-seat casting 68, rigidly supported by one end flange of the cylinder-casting 28. (See Figs. 1, 7, 8, and 9.) Mounted within the casting 68 is a rotary valve 69, which is formed with one pair of ports 70 71 and 70ª 71ª, said ports being shown, respectively, in Figs. 8 and 9. The valve 69 at one end is shown as provided with a handpiece 69ª, by means of which it may be turned. In the position of the valve shown in Figs. 7, 8, and 9 the port 71 opens up communication between the port 67 and a port 72, formed in the casting 68, and through the port 70ª opens up a port 73 to exhaust, as shown in Fig. 9. The port 72 leads to a tube 74, and the port 73 leads to a tube 75, which tubes are rigidly secured to one flange of the cylinder-casting 28 and are provided at their outer ends with stuffing-boxes 76. Relatively fixed tubes 74ª and 75ª telescope into the tubes 74 75, respectively, as best shown in Fig. 7, and lead, respectively, to the upper and lower ends of the cylinder 63, formed within the driving-head 34. (See Fig. 3.)

With the valve 69 set as shown in Figs. 8 and 9 live steam or air will be admitted into the upper end of the cylinder 63, while the lower end of said cylinder will be opened up to exhaust. Hence under these conditions the piston 64, and hence, of course, the secondary driving-head 57 and the saw, will be yieldingly forced downward. When, however, the valve 69 is moved approximately ninety degrees in either direction from the position shown in Figs. 8 and 9, the port 72 will be open to exhaust, and live steam will be admitted into the port 73, and hence into the lower end of the cylinder 63, thereby causing the piston 64 to rise, carrying with it the secondary driving-head 57 and the saw.

Operation: From what has been said it will be understood that the saw and the saw-driving heads or reciprocating support therefor are capable of substantially universal adjustments with respect to a horizontal plane and with respect to the sled or ground-engaging member.

The device is of course adapted for use to saw down trees and for use thereafter to saw the tree into logs. In the drawings the saw is shown as set in a vertical plane, and hence is adapted for use at such time to saw a horizontally-disposed tree-trunk into logs. To set the saw for sawing off standing trees, the hand-screw 61 should be loosened, the saw should then be turned into a horizontal plane, and said screw 61 should then be again tightened to hold the saw in its set position in a plane intersecting the axis of the cylinder 63 at an angle of ninety degrees. By vertical movements of the piston 64 under the control of the air-regulating valve 61 the saw should be raised or lowered until brought to the desired elevation above the ground. It will usually happen that the sled 1 will not rest upon level ground; but it is nevertheless desirable that the saw should be set to work on a horizontal plane when it is used to saw off a perpendicular object, such as a standing tree. The saw may be thus set regardless of the position of the sled by first adjusting the cylinder-casting 28 on the segmental bearing-block 27, thereby imparting an angular movement to the saw and by proper adjustments bringing both ends of the saw into the same horizontal plane. Then by adjustments of the segmental bearing-block 27 on the segmental bearing 19 of the turn-table base 18 the cylinder-casting 28 may be oscillated transversely, so as to bring the cylinder 63 into a true vertical position, and thereby set the saw to cut in a horizontal plane.

The saw when set horizontally, as above described, may be forced to its work and caused to travel through the trunk of the tree by an angular movement imparted thereto by a rotary adjustment of the turn-table 18. Furthermore, by the movements of the said turn-table the saw may be set to cut under a reciprocating movement longitudinally of the sled or transversely thereof, as may be desired. With the saw set in a horizontal plane and extending longitudinally of the sled 1 the said saw may be fed to its work by movement of the secondary base-support 12 under the action of the screw 14. On the other hand, with the said saw set to work in a horizontal plane, but transversely of the sled, feed movements may be imparted to the saw by adjustments of the primary base-support 3 under the action of the long feed-screw 4.

When the saw is to be used to saw a felled tree into logs, it should be turned vertically into the plane of the axis of the cylinder 63. Then by adjustments of the segmental bearing-block 27 the saw may be set to cut in a vertical plane or in a plane at any angle to the vertical plane which may be desired. By movements of the turn-table 18 the saw may be swung horizontally until it crosses the log or tree-trunk at a right angle. The saw being thus positioned, it may be yieldingly fed to its work and caused to travel downward through the log by air admitted into the upper end of the cylinder 63. The saw when set as above described may also be fed to its work by angular movement imparted thereto by adjustments of the cylinder-casting 28 on the segmental bearing-block 27 under the action of the worm 31. The saw may also be caused to cut under a vertically-upward movement when the saw is turned teeth edge upward in the shank or holder 56. The saw may of course be caused to cut by movement either toward the right or toward the left when the saw is turned in a horizontal plane. It will also be understood that the various adjustments of the parts which support the saw make it possible to project the saw for action in any desired direction, and hence considerable ground may be covered without moving the sled or portable saw-support.

The portable sawmill described, while especially adapted for use in the woods for felling trees and sawing the same into logs, is nevertheless capable of general use wherever a device of the general character of the mill herein disclosed is desired. The said mill, as is evident, is capable of many modifications within the scope of my invention as herein set forth and claimed. It is of course evident that the so-called "portable" support instead of being in the form of a sled might be a wheeled truck or trucks or might take other forms.

What I claim, and desire to secure by Letters Patent of the United States, is as follows:

1. The combination with a portable support, of a primary support, slidably mounted thereon, a secondary support slidably mounted on said primary support transversely of its line of adjustment, a turn-table mounted on said secondary support and provided with a segmental bearing-surface, a segmental bearing-block mounted on the segmental bearing-surface of said turn-table and having a segmental bearing-surface lying in a plane transversely intersecting the said afore-noted bearing-surface, a straight-line reciprocating engine, having its cylinder-casting mounted for angular movements on the segmental bearing-surface of said segmental bearing-block, a driving-head mounted to reciprocate on said cylinder-casting and connected to the piston of said reciprocating engine, and a saw carried by said driving-head, substantially as described.

2. The combination with a reciprocating driving-head having an adjustable secondary section, of a straight-line reciprocating engine connecting the primary and secondary sections of said driving-head, and a saw applied to the secondary section of said driving-head, and adapted to be yieldingly forced to its work under the action of said engine, substantially as described.

3. The combination with a reciprocating driving-head, provided with a secondary section, of a straight-line reciprocating engine connected to the primary section of said driving-head and arranged to reciprocate the same, of a second straight-line reciprocating engine connecting the primary and secondary sections of said driving-head, and a saw applied to the secondary section of said driving-head, whereby the saw is given its operative movements by the first-noted engine, and is fed to its work by the second-noted engine, substantially as described.

In testimony whereof I affix my signature in presence of two witnesses.

HENRY B. FREY.

Witnesses:
R. C. MABEY,
F. D. MERCHANT.